(12) United States Patent
Sato et al.

(10) Patent No.: US 8,803,035 B2
(45) Date of Patent: Aug. 12, 2014

(54) EQUALIZING MECHANISM OF WELDING APPARATUS

(75) Inventors: Yoshio Sato, Ayase (JP); Arinobu Mori, Ayase (JP); Shinichi Kurihara, Ayase (JP); Kenji Hayafuji, Ayase (JP); Tsuneaki Sudo, Ayase (JP)

(73) Assignee: Obara Group Incorporated, Kanagawa (JP)

( * ) Notice: Subject to any disclaimer, the term of this patent is extended or adjusted under 35 U.S.C. 154(b) by 248 days.

(21) Appl. No.: 13/165,030

(22) Filed: Jun. 21, 2011
(Under 37 CFR 1.47)

(65) Prior Publication Data
US 2012/0043308 A1 Feb. 23, 2012

(30) Foreign Application Priority Data

Jun. 23, 2010 (JP) .................................. 2010-142723

(51) Int. Cl.
| | |
|---|---|
| *B23K 9/32* | (2006.01) |
| *B23K 37/02* | (2006.01) |
| *B23K 9/28* | (2006.01) |
| *B23K 11/10* | (2006.01) |
| *B23K 9/12* | (2006.01) |
| *F16H 35/18* | (2006.01) |
| *F16F 15/22* | (2006.01) |
| *G05G 1/00* | (2008.04) |
| *G05G 3/00* | (2006.01) |
| *B23K 11/11* | (2006.01) |
| *B23K 11/31* | (2006.01) |

(52) U.S. Cl.
CPC ............ *B23K 11/315* (2013.01); *B23K 11/115* (2013.01); *B23K 11/317* (2013.01)
USPC ..................... 219/158; 219/86.25; 219/86.31; 219/86.32; 219/86.33; 219/86.61; 219/86.41; 219/86.51; 74/10.37; 74/10.45; 74/10.9; 74/570.1; 74/570.2

(58) Field of Classification Search
USPC .............. 219/86.25–86.33; 74/595–597, 527, 74/526
See application file for complete search history.

(56) References Cited

U.S. PATENT DOCUMENTS 1,548,397 A * 8/1925 Taylor ......................... 219/86.51
1,866,382 A * 7/1932 White .............................. 219/56
(Continued)

FOREIGN PATENT DOCUMENTS

| CN | 1923440 A | 3/2007 |
|---|---|---|
| JP | 11-10349 | 1/1999 |

(Continued)

OTHER PUBLICATIONS

European Search Report issued Nov. 17, 2011 in European Patent Application No. EP 11 00 5103.

*Primary Examiner* — Dana Ross
*Assistant Examiner* — Gyounghyun Bae
(74) *Attorney, Agent, or Firm* — Wenderoth, Lind & Ponack, L.L.P.

(57) ABSTRACT

An equalizing mechanism of a welding apparatus connects an apparatus body and a fixed bracket, and includes a fixed member on the fixed bracket, and a pressure shaft on an apparatus body close to a bottom face of the fixed member. A cutout is at a position facing the fixed member A movable member on the apparatus body accommodates the fixed member. A restrictive member located by side faces of the fixed member and the movable member restricts relative movement thereof to a direction parallel to the pressure shaft. A driven lever is supported by a front portion of the fixed member to abut on an inner front face of the movable member at one end and abut on the pressure shaft at an other end. A spring between a back portion of the fixed member and an inner back face of the movable member presses the two members to move away from each other.

8 Claims, 9 Drawing Sheets

(56) References Cited

U.S. PATENT DOCUMENTS

| | | | | |
|---|---|---|---|---|
| 2,253,702 A | * | 8/1941 | Hall | 219/86.25 |
| 2,511,050 A | * | 6/1950 | Dunn | 219/86.61 |
| 2,693,555 A | * | 11/1954 | North et al. | 257/41 |
| 2,796,512 A | * | 6/1957 | Gray, III | 219/85.14 |
| 3,102,947 A | * | 9/1963 | Blackman | 219/137.52 |
| 3,275,790 A | * | 9/1966 | Helms | 219/56.21 |
| 3,602,245 A | * | 8/1971 | Meisel | 137/270 |
| 3,676,631 A | * | 7/1972 | Ritter et al. | 219/56 |
| 4,028,960 A | * | 6/1977 | Hauser et al. | 74/473.21 |
| 4,667,587 A | * | 5/1987 | Wunder | 99/295 |
| 4,673,786 A | * | 6/1987 | Gott et al. | 219/56 |
| 4,737,611 A | * | 4/1988 | Humblot | 219/86.25 |
| 4,894,507 A | * | 1/1990 | Thode | 219/86.7 |
| 5,010,228 A | * | 4/1991 | Nishiwaki | 219/86.25 |
| 5,157,234 A | * | 10/1992 | Umeda | 219/89 |
| 5,537,892 A | * | 7/1996 | Wiechman | 74/527 |
| 5,628,923 A | * | 5/1997 | Nishiwaki | 219/86.25 |
| 5,990,442 A | * | 11/1999 | Suita et al. | 219/86.25 |
| 6,131,480 A | * | 10/2000 | Yoneyama | 74/490.13 |
| 6,512,194 B1 | * | 1/2003 | Koshurba et al. | 219/86.25 |
| 6,653,590 B1 | * | 11/2003 | Aoyama et al. | 219/86.25 |
| 2010/0025383 A1 | * | 2/2010 | Tiberghien | 219/119 |

FOREIGN PATENT DOCUMENTS

| | | | |
|---|---|---|---|
| JP | 2002-219577 | | 8/2002 |
| JP | 2004-90020 | | 3/2004 |
| JP | 2010/142847 | * | 1/2010 |
| JP | 2010-142847 | | 7/2010 |

* cited by examiner

ALONG B TO B LINE

FIG. 1C

ALONG A TO A LINE

FIG. 2A

ALONG C TO C LINE

FIG. 2B

ALONG D TO D LINE

FIG. 2C

ALONG A TO A LINE

EQUALIZING MECHANISM OF WELDING APPARATUS

CROSS REFERENCE TO RELATED APPLICATION

The present application is based on and claims priority from Japanese Patent Application No. 2010-142723, filed on Jun. 23, 2010, the disclosure of which is hereby incorporated by reference in its entirety.

BACKGROUND OF THE INVENTION

1. Field of the Invention

The present invention relates to resistance welding apparatus, particularly to an equalizing mechanism which allows the welding apparatus to follow a workpiece.

2. Description of the Prior Art

Resistance welding is to locally heat a workpiece held together between two electrodes by intensively applying electric current flow and pressure thereto with the electrodes.

Such welding apparatus is connected to a robot arm or placed in a predetermined position to perform the weld on an accurate position of workpiece with a robot teaching system. Equal electrode pressure is applied on both sides of the workpiece when the workpiece and the electrodes are accurately positioned. However, the electrodes tend to wear, and it is very hard to constantly maintain the positions of the workpiece and the electrodes. Moreover, with use of a robot having a low teaching accuracy or workpiece pressed with a low precision, the workpiece and the electrodes are likely to be inaccurately positioned, causing such a problem that the workpiece is deformed by a pressurization of the welding apparatus.

With a view to solving this problem, the welding apparatus needs to include an equalizing mechanism for negating an error in the positional relation between the workpiece and electrodes.

Figure 9:
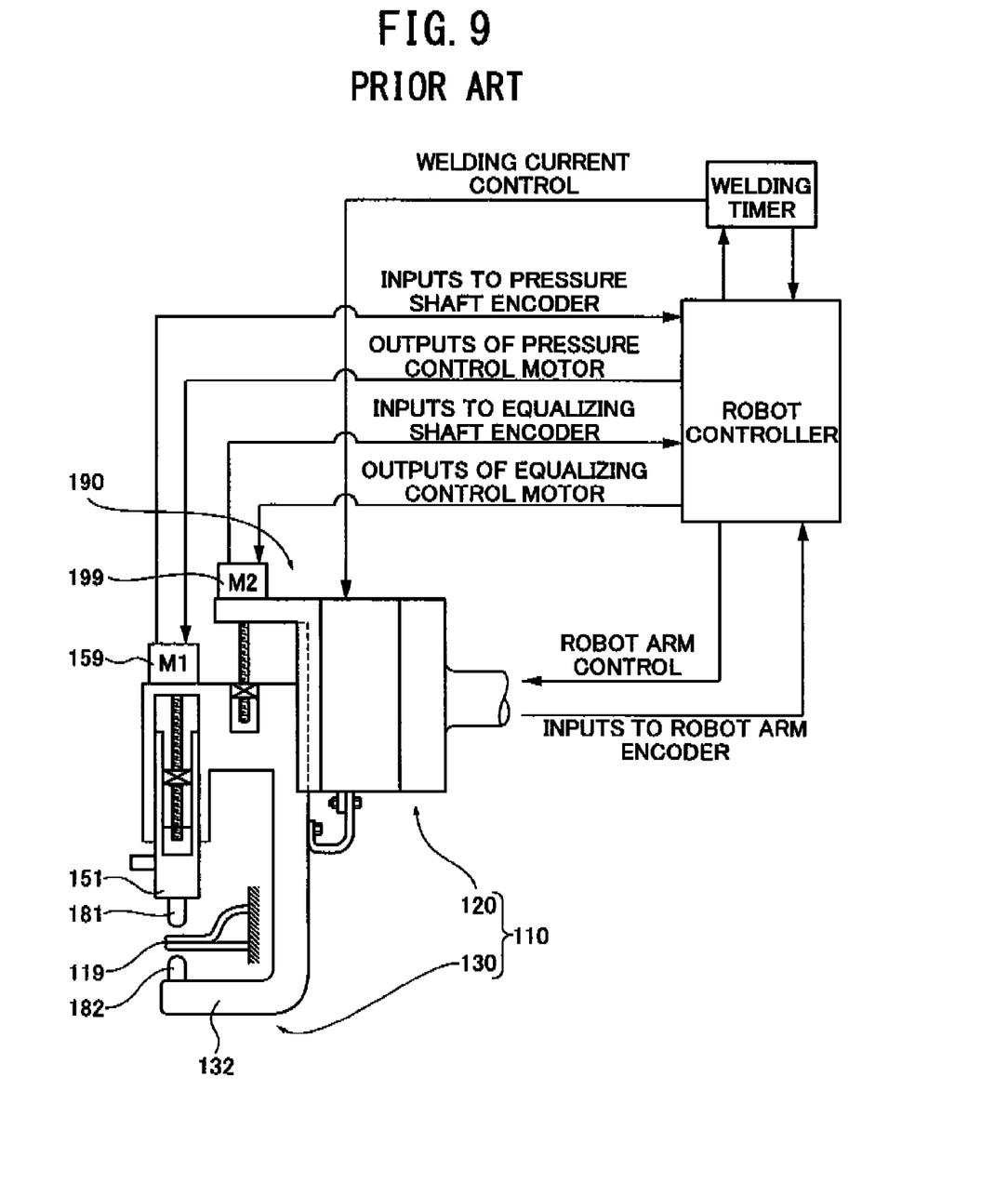
FIG. 9 schematically shows an example of conventional welding apparatus.

Japanese Patent Application Publication No. 2004-090020 discloses conventional welding apparatus and equalizing mechanism, for example. With reference to FIG. 9, welding apparatus 110 comprises a fixed bracket 120 connected to a robot arm and an apparatus body 130 to be equalized. The apparatus body 130 comprises an arm 132 including a pressure shaft 151 on one end on which one electrode 181 is mounted and an other electrode 182 is mounted on the other end of the arm 132.

The pressure shaft 151 is driven by a motor 159 to move forward and backward and the electrode 182 is placed on the axial line. Thus, the two electrodes 181, 182 are configured to relatively approach or move away from each other on a substantially straight line.

An equalizing mechanism 190 is provided to connect the fixed bracket 120 and the apparatus body 130, and is driven by a motor 199 to move the apparatus body 130 relative to the fixed bracket 120 in parallel to the pressure shaft 151. The two motors 159, 199 are servo motors having encoders thereon to be able to accurately control the positions of the electrodes 181, 182 using positional data from the encoders, torque of the motors 159, 199, and current flow data.

However, there is a problem with this welding apparatus 110 in an increase of the size due to use of the two motors 159, 199, and difficulty in compact design. Further, controlling the two motors 159, 199 along with the robot arm requires a complicated control system, which needs a large amount of time and labor to set the system.

SUMMARY OF THE INVENTION

The present invention aims to provide resistance welding apparatus in a compact structure incorporating an improved equalizing mechanism. Further, it aims to provide welding apparatus in which pre-operational setting can be easily done and which can quickly operate to shorten the operation time.

According to one aspect of the present invention, an equalizing mechanism of a welding apparatus is configured to connect an apparatus body and a fixed bracket connected with a robot arm or a mount, which comprises a fixed member provided on the fixed bracket. A pressure shaft moves an electrode, provided on the apparatus body close to a bottom face of the fixed member, and comprises a cutout at a position facing the fixed member. A movable member provided on the apparatus body to accommodate the fixed member. A restrictive member is provided by side faces of the fixed member and the movable member to restrict relative movement of the fixed member and the movable member to a direction parallel to the pressure shaft. A driven lever is supported by a front portion of the fixed member to abut on an inner front face of the movable member at one end and abut on the pressure shaft at the other end and a spring is provided between a back portion of the fixed member and an inner back face of the movable member to press the fixed member and the movable member to move away from each other.

BRIEF DESCRIPTION OF THE DRAWINGS

Features, embodiments, and advantages of the present invention will become apparent from the following detailed description with reference to the accompanying drawings:

FIGS. 3A, 3B show operation of the equalizing mechanism in FIG. 1, where

FIGS. 4A, 4B show operation of the equalizing mechanism of the welding apparatus in FIGS. 5 to 8, where

DETAILED DESCRIPTION OF THE PREFERRED EMBODIMENT

Figure 1A:
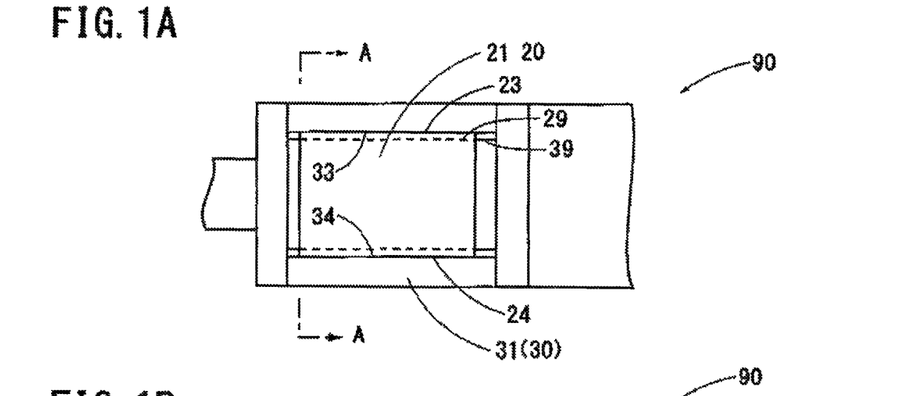
FIGS. 1A to 1C schematically show an equalizing mechanism according to one embodiment of the present invention, including a plan view, a cross sectional view along a B to B line in FIG. 1C, and a cross sectional view along an A to A line in FIG. 1A, respectively.
Figure 1B:
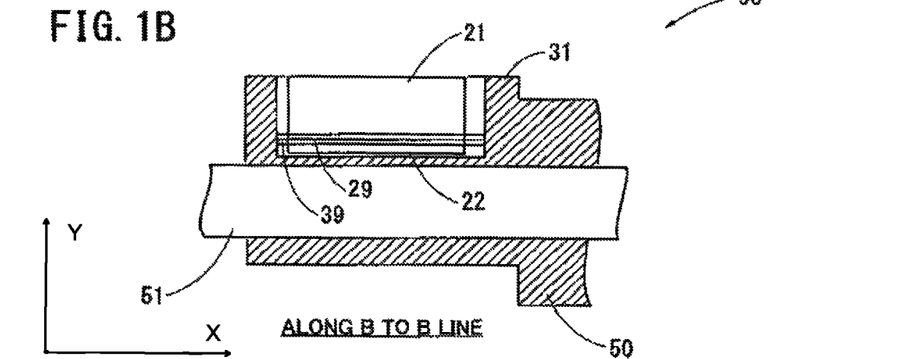
Figure 1C:
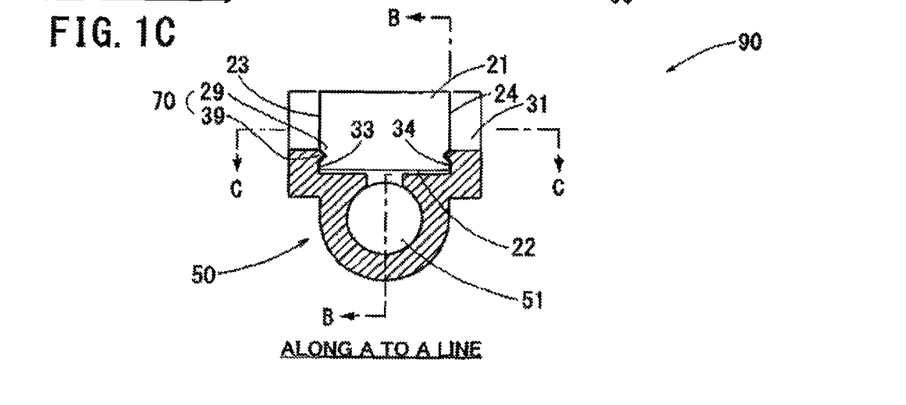

Hereinafter, embodiments of the present invention will be described in detail with reference to the accompanying drawings. FIGS. 1A to 1C schematically show an equalizing mechanism according to one embodiment of the present invention. FIGS. 1A to 1C are a plan view, a cross sectional view along a B to B line in FIG. 1C, and a cross sectional view along an A to A line in FIG. 1A, respectively. Note that wherever possible, the same reference numbers will be used throughout the drawings to refer to the same or like parts.

First Embodiment

An equalizing mechanism 90 according to a first embodiment of the present invention functions as an element of a welding apparatus and is configured to connect a fixed bracket 20 connected with a robot arm or a mount and an apparatus body 30. The equalizing mechanism 90 comprises a fixed member 21 on the fixed bracket 20 (see FIG. 5). The fixed member 21 is approximately a hexahedron (quadratic prism) in the present embodiment, for example. The equalizing mechanism 90 further comprises, on the apparatus body 30, a movable member 31 accommodating the fixed member 21 and a pressure shaft 51 to move an electrode.

The structural features of the equalizing mechanism 90 are as follows. The fixed member 21 is placed so that a bottom face 22 and side faces 23, 24 thereof are parallel to the pressure shaft 51 and the bottom face 22 is close to the pressure shaft 51. A restrictive member 70 is provided by the side faces 23, 24 of the fixed member 21 and the side faces 33, 34 of the movable member 31, to relatively move the fixed member 21 and the movable member 31 only in a direction parallel to the pressure shaft 51.

As shown in FIG. 1C, the restrictive member 70 is formed of a groove 29 on one face and a protrusion 39 on the other face which are slidably engaged with each other. Alternatively, the restrictive member 70 can be formed of two grooves on both of the side faces which slide with a rod-like member inserted or a plurality of steel balls in the grooves, for example.

The equalizing mechanism 90 as thus configured can be compact in size since the pressure shaft 51 is disposed close to the fixed bracket 21. Further, it can be simple in structure and excellent in strength owing to the restrictive member 70 provided on the two side faces 23, 24 of the hexahedron fixed member 21. Moreover, having the sliding portion inside, it can be structurally unsusceptible to contamination, damage, or the like and stably used over a long period of time. Note that in the present embodiment the fixed member 21 is a hexahedron (quadratic prism), but it can be prisms such as a pentaprism or a hexagon prism, or a cylinder.

Figure 2A:
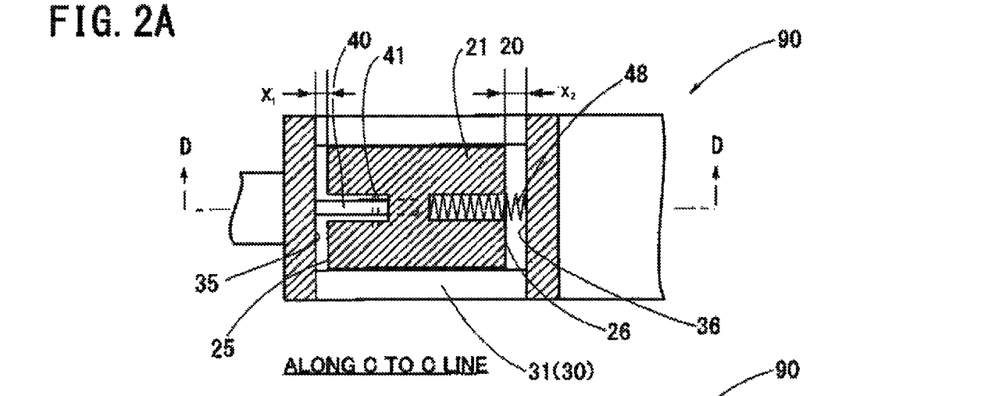
FIGS. 2A to 2C show the equalizing mechanism in FIG. 1 in detail, and are cross sectional views along a C to C line in FIG. 1C, along a D to D line in FIG. 2A, and along the A to A line in FIG. 1A, respectively.
Figure 2B:
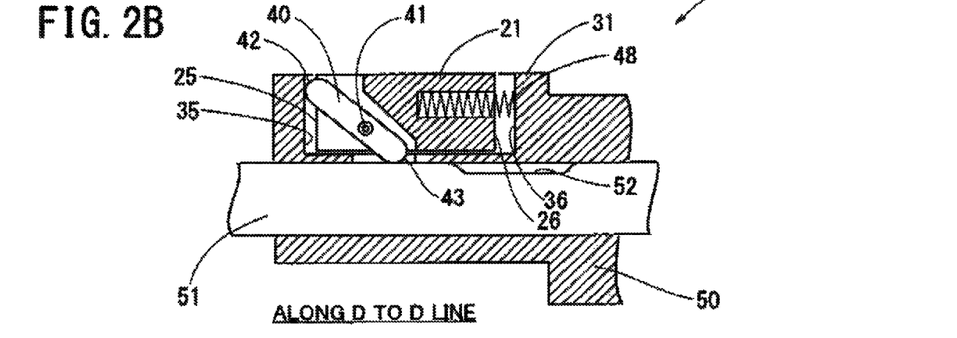
Figure 2C:
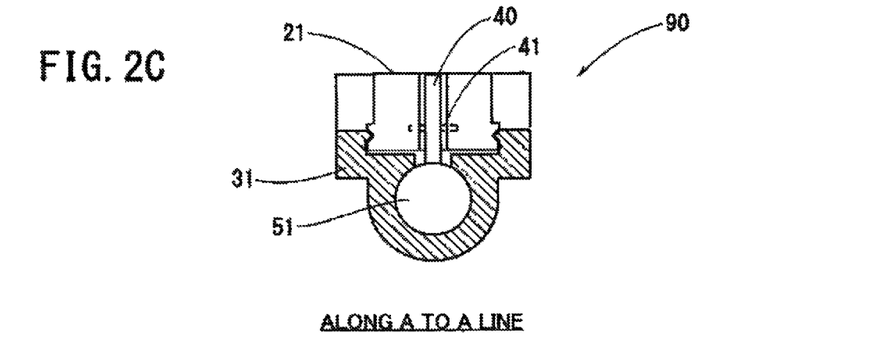

FIGS. 2A to 2C show the equalizing mechanism in FIGS. 1A to 1C in detail. FIG. 2A to 2C are a cross sectional view along a C to C line in FIG. 1C, along a D to D line in FIG. 2A, and along the A to A line in FIG. 1A, respectively.

The pressure shaft 51 comprises a cutout 52 at a position facing the fixed member 21. The fixed member 21 includes, at a front (electrode side), a driven lever 40 which rotates around an axis 41. The driven lever 40 is thus supported by the fixed member 21 and abuts on an inner front face 35 of the movable member 31 at one end 42 and abuts on the pressure shaft 51 at the other end 43. Further, a spring 48 is provided between a back portion of the fixed member 21 and an inner back face 36 of the movable member 31 to press the two members to move away from each other.

In FIG. 2A there are a gap $x_1$ between the front portion 25 of the fixed member 21 and the inner front face 35 of the movable member 31 and a gap $x_2$ between the back portion 26 of the fixed member 21 and the inner back face of the movable member 31. A force of the spring 48 acts between the fixed member 21 and the movable member 31. When the movable member 31 receives leftward external force, the spring 48 is compressed, allowing the movable member 31 to move leftward. The maximal length in which the movable member 31 is movable is the gap $x_2$.

Oppositely, when receiving rightward external force, the movable member 31 cannot move since the driven lever 40 prevents the movable member 31 from moving rightward. The driven lever 40 between the fixed member 21 and the movable member 31 is not rotatable here because it abuts on the inner front face 35 of the movable member and the pressure shaft 51.

The pressure shaft 51 moves forward and backward relative to the movable member 31. In FIG. 2B the cutout 52 is separated away from the driven lever 40. When the pressure shaft 51 moves forward (leftward in the drawing), the cutout 52 moves closer to the driven lever 40. Further movement of the pressure shaft 51 makes the driven lever 40 slightly rotate and the end 43 of the driven lever abuts on the cutout 52. By this operation, a movable range (the gap $x_1$) between the movable member 31 and the fixed member 21 in the equalizing mechanism 90 can be formed.

Figure 3A:
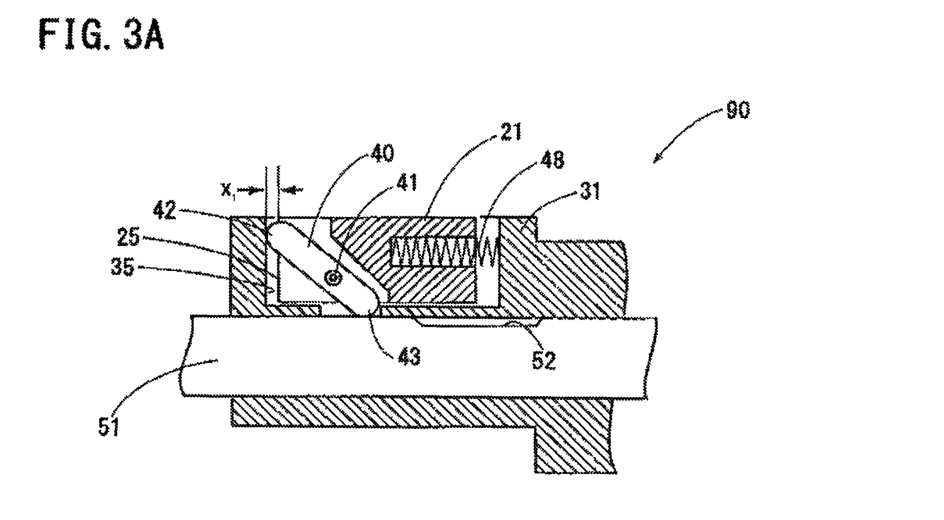
FIG. 3A shows an apparatus body in forward motion to a fixed bracket and FIG. 3B shows the apparatus body in a most retreated position relative to the fixed bracket.
Figure 3B:
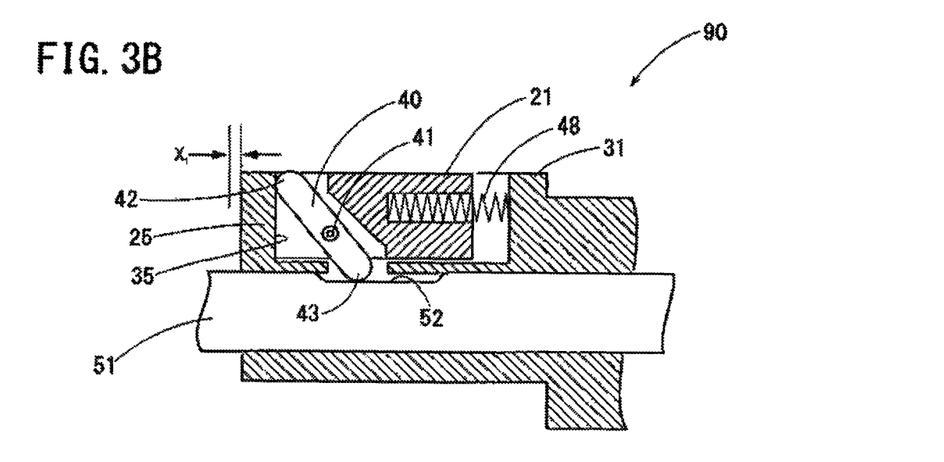

FIGS. 3A, 3B show the operation of the equalizing mechanism 90 in FIGS. 1A to 1C. FIG. 3A corresponds to FIG. 2B and there is the gap $x_1$ between the front portion 25 of the fixed member 21 and the inner front face 35 of the movable member 31. FIG. 3B shows that along with forward movement of the pressure shaft 51 from that in FIG. 3A, the end 43 of the driven lever 40 abuts on the cutout 52.

From FIGS. 3A to 3B, the driven lever 40 becomes rotatable and slightly rotates clockwise. This releases the movable member 31 from the blocking by the driven lever 40 and allows it to move rightward by force of the spring 48 by the gap $x_1$ between the front portion 25 of the fixed member 21 and the inner front face 35 of the movable member 31.

The pressure shaft 51 has a not-shown electrode (at left end in the drawing). Along with leftward movement of the pressure shaft 51, the electrode approaches an opposite electrode. Just before a workpiece is held between the two facing electrodes, the end 43 of the driven lever 40 abuts on the cutout 52 along with forward movement of the pressure shaft 51, as shown in FIGS. 3A, 3B. Therefore, if an error occurs in the positions of the workpiece and the electrodes and the error is smaller than a value of the gaps $x_1+x_2$ the action of the spring 48 can negate the error. Accordingly, a welding apparatus including the equalizing mechanism can properly perform resistance welding on the workpiece with a proper pressure according to a welding condition. Note that the ratio of $x_1$ and $x_2$, is adjustable according to motion of robot teaching or else, and the value of $x_2$ can be arbitrarily decided as long as it is zero or more.

Second Embodiment

Figure 4A:
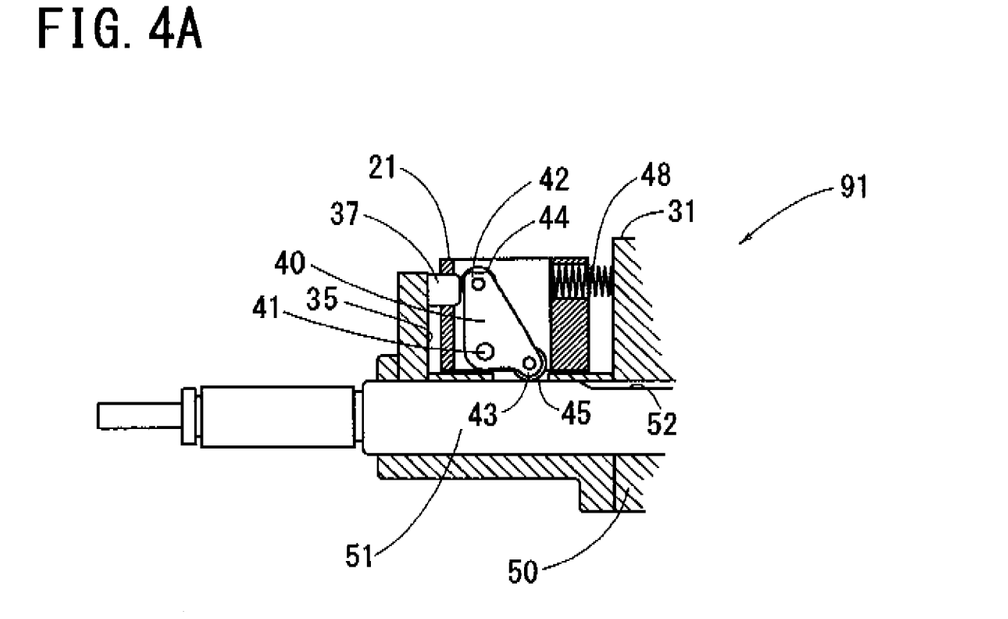
FIG. 4A shows an apparatus body in forward motion to a fixed bracket and FIG. 4B shows the apparatus body in a most retreated position relative to the fixed bracket.
Figure 4B:
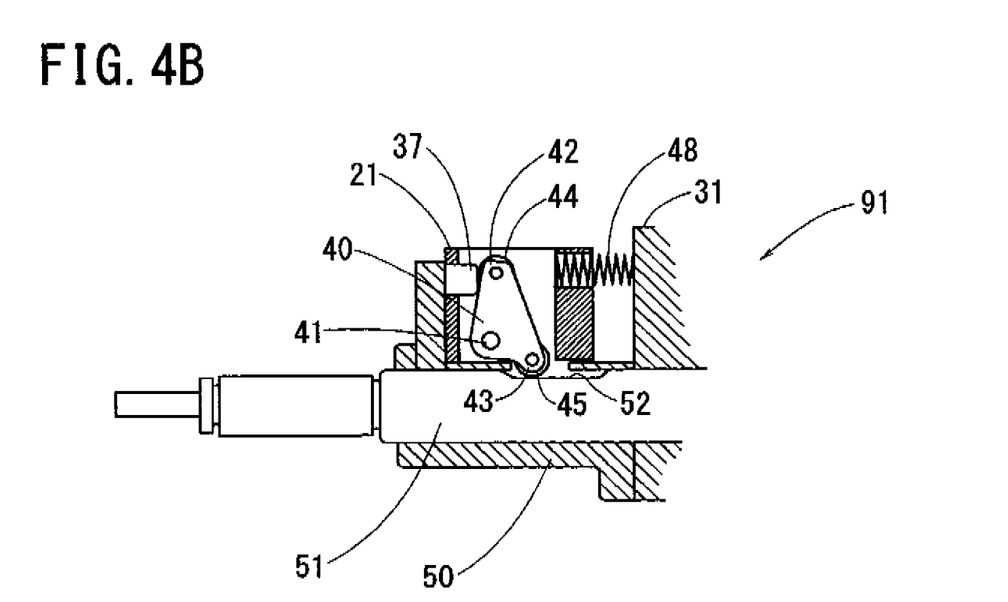

FIGS. 4A, 4B show an example of an equalizing mechanism 91 according to a second embodiment of the present invention, and correspond to FIGS. 3A, 3B. The equalizing mechanism 91 is different from mechanism 90 in the driven lever 40. The driven lever 40 includes an axis 41 in a position greatly away from a straight line connecting both ends 42, 43. Also, it comprises rollers 44, 45 at both ends 42, 43. The roller 44 abuts on a stopper 37 protruding from the inner front face 35 of the movable member 31. Thereby, the driven lever 40 can be more reliably operated, contributing to an improvement of the reliability of the equalizing mechanism 91. In place of the rollers 44, 45, the driven lever 40 can have a wear-resistant material attached to both ends 42, 43.

Third Embodiment

Figure 5:
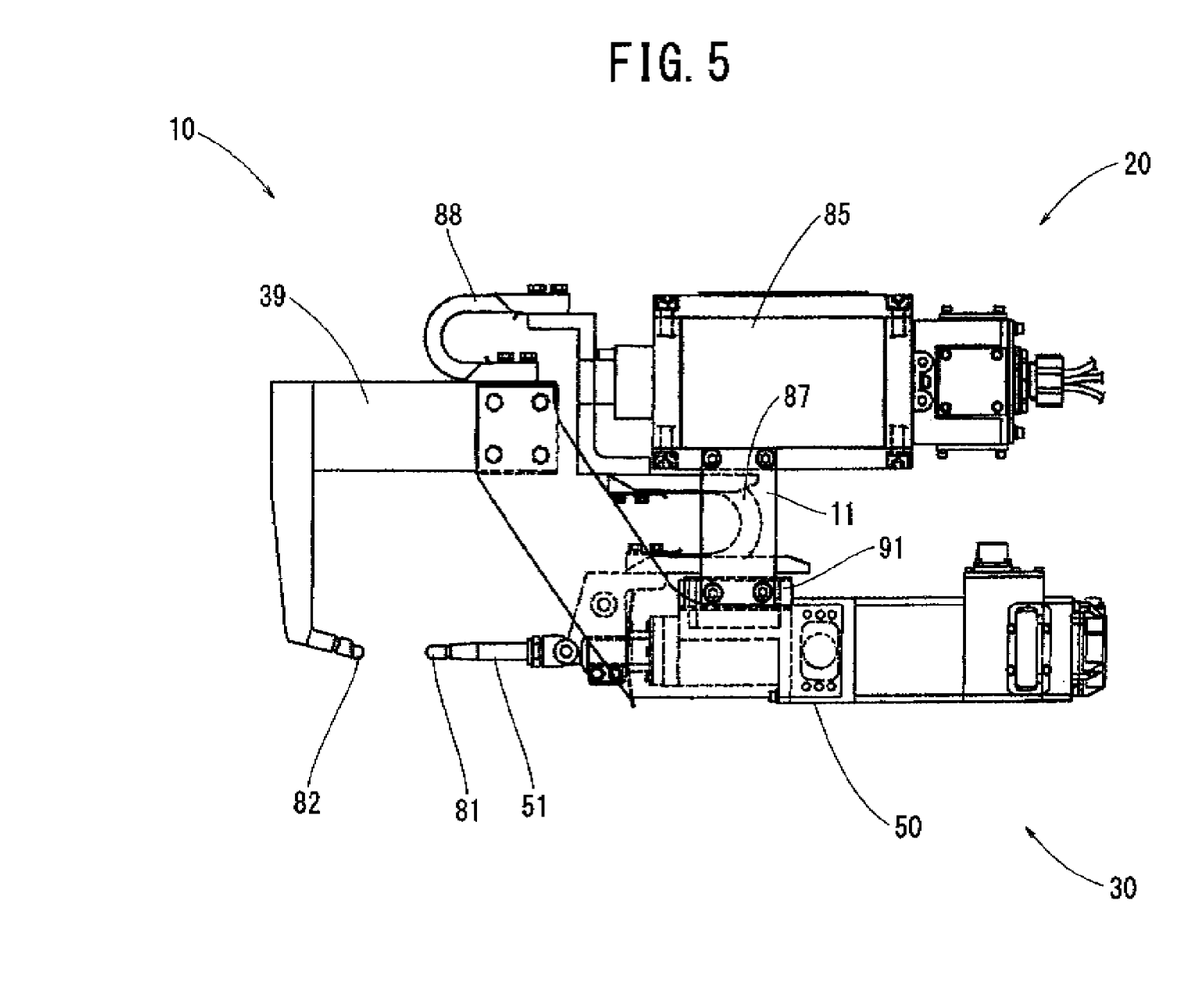
FIG. 5 is a side view of welding apparatus according to one embodiment of the present invention.
Figure 6:
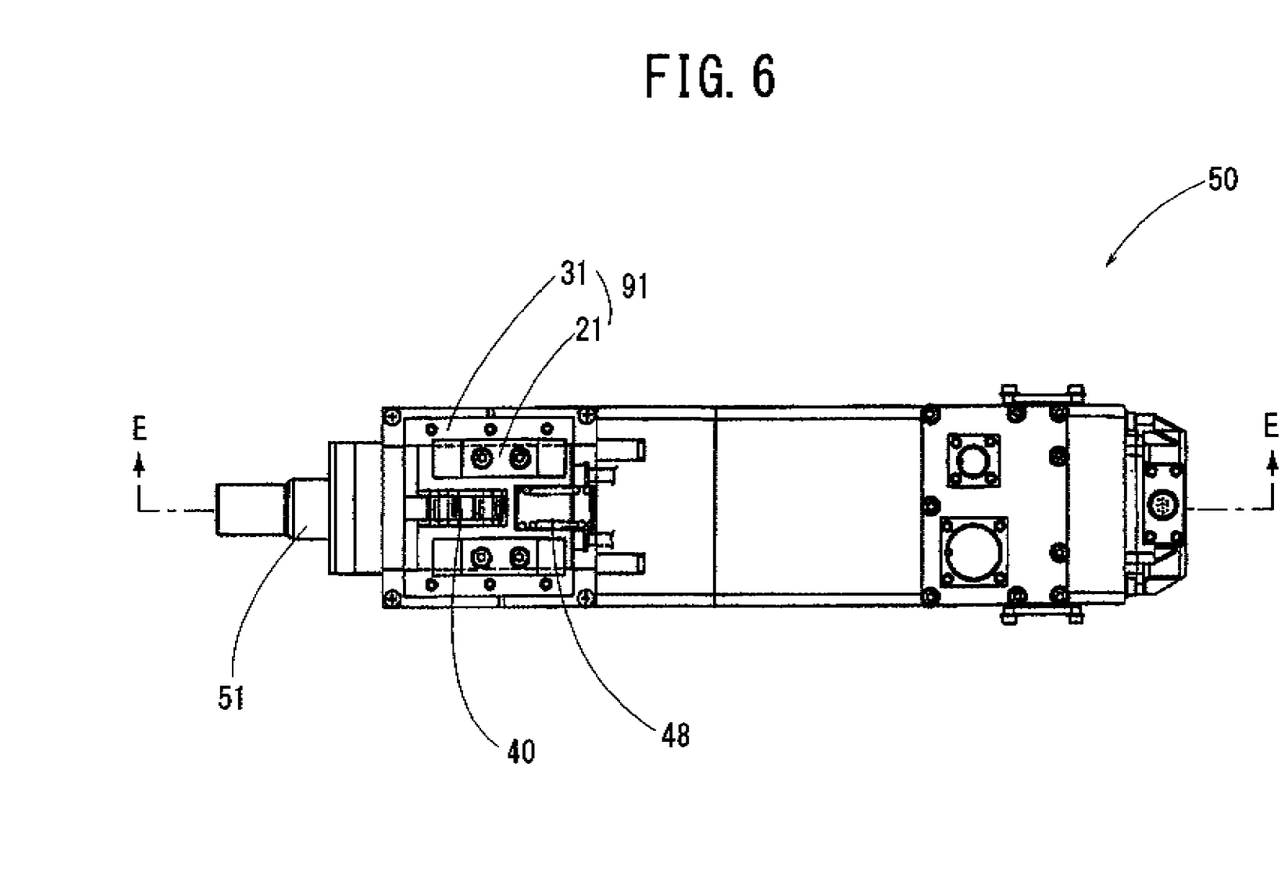
FIG. 6 is a plan view of an apparatus body of the welding apparatus in FIG. 5.
Figure 7:
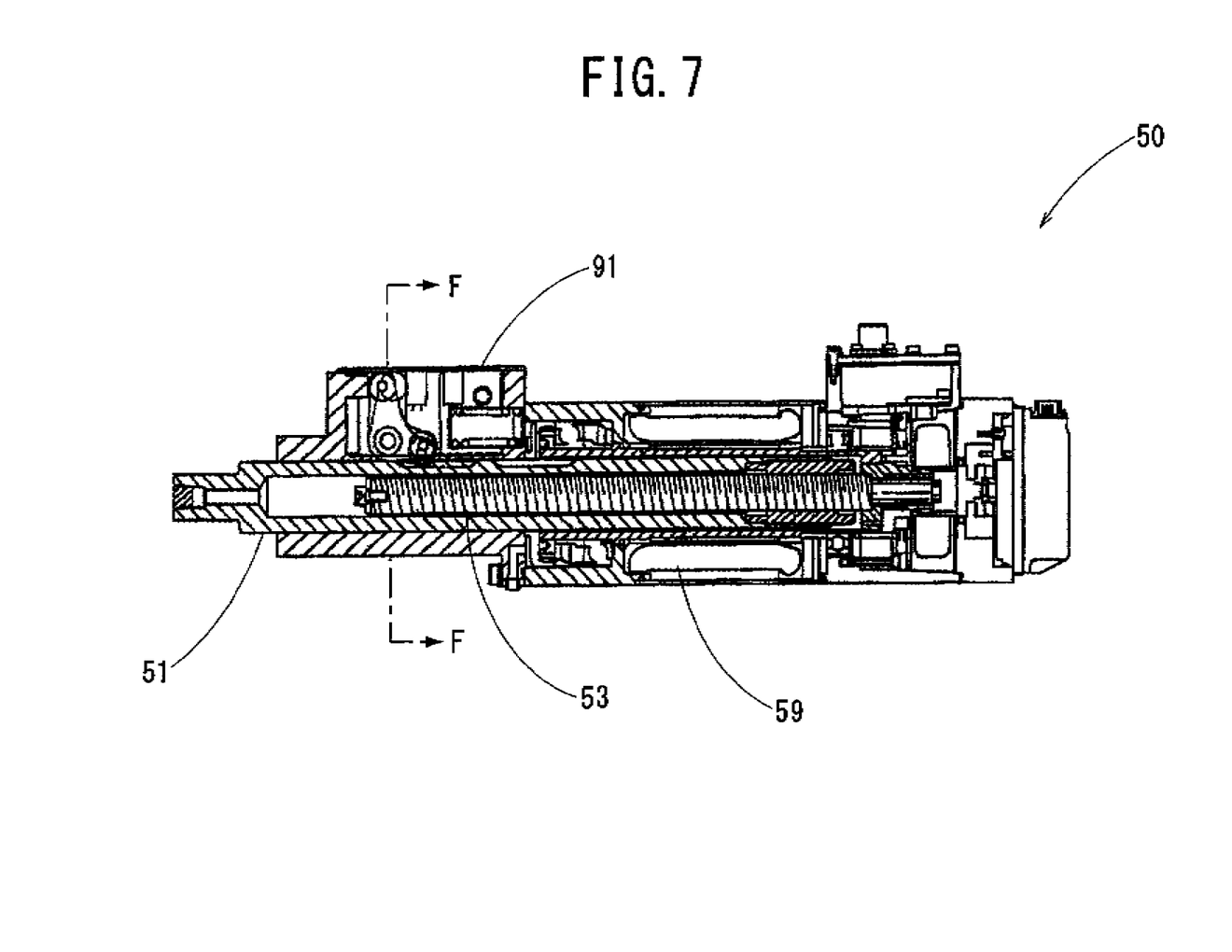
FIG. 7 is a cross sectional view of the apparatus body along an E to E line in FIG. 6.
Figure 8:
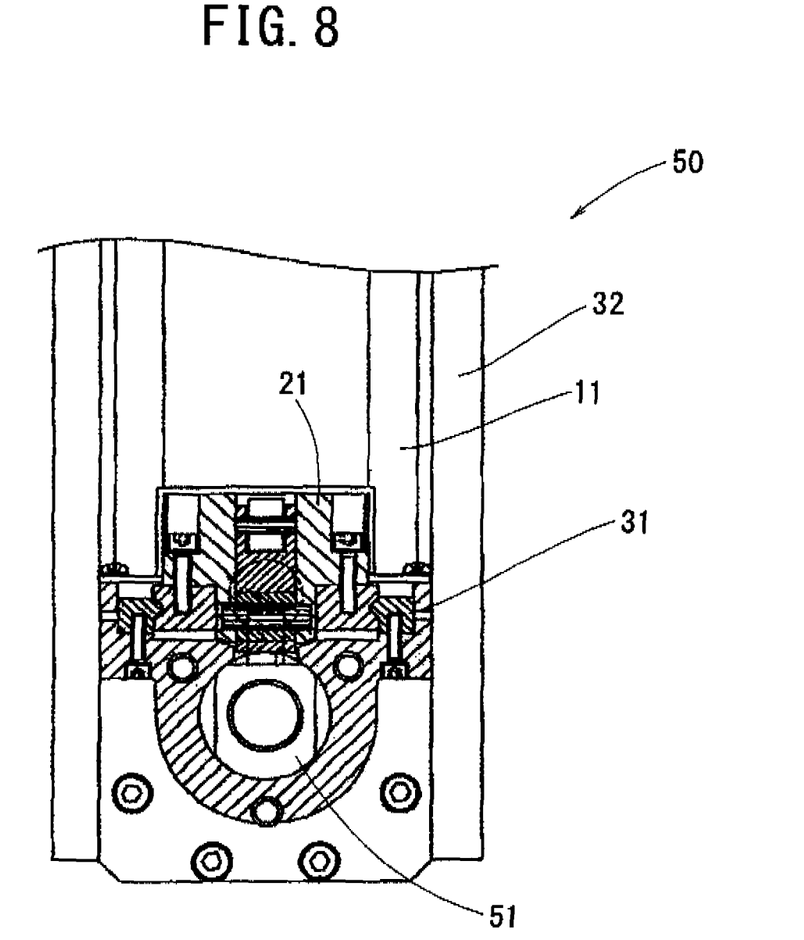
FIG. 8 is a cross sectional view of the apparatus body along an F to F line in FIG. 7.

Referring to FIGS. 5 to 8, a welding apparatus 10 incorporating the equalizing mechanism 91 according to the second embodiment will be described. FIGS. 5, 6 are a side view and a plan view of the welding apparatus 10, and FIGS. 7, 8 are cross sectional views along an E to E line in FIG. 6 and along an F to F line in FIG. 7.

The welding apparatus 10 comprises a fixed bracket 20 connected to a robot arm and an apparatus body 30 which includes an arm 32 having a pressure shaft 51 at one end. One electrode 81 is provided at one end of the pressure shaft 51, and the other electrode 82 is provided at the other end of the arm 32.

The fixed bracket 20 includes a transformer 85 which applies current to the two electrodes 81, 82 via shunts 87, 88. The equalizing mechanism 91 according to the second embodiment connects the fixed bracket 20 and the apparatus body 30, and is provided on the front side of the apparatus body 30.

In the apparatus body 30 in FIG. 7 the pressure shaft 51 is driven by a motor 59 to rotate a screw shaft 53 to move forward and backward. In place of the motor 59, a pneumatic or hydraulic cylinder can be used to drive the pressure shaft 51.

As described above, a welding apparatus 10 compact in size can be realized. Moreover, without a complicated control system, the mechanical equalizing mechanism 91 can quickly operate. By setting a distance between the workpiece and the electrode 82 to be smaller than a value of the gaps $x_1+x_2$, the welding apparatus 10 can negate an error in positions of the workpiece and the electrodes and properly perform resistance welding on the workpiece with a proper pressure depending on a welding condition.

Needless to say, the present invention is applicable to a welding apparatus which is fixed to a mount and to which the workpiece is transferred by a robot between the electrodes, in addition to the one in the above-described embodiment.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An equalizing mechanism for use in a welding apparatus that includes a fixed bracket configured to be connected to a robot arm or a mount, a pair of electrodes for applying a weld to a workpiece, a movable pressure shaft for moving one of the electrodes, and an apparatus body, wherein the equalizing mechanism connects the fixed bracket and the apparatus body, is configured to correct an error in position of the work piece and the electrodes, and comprises:
a fixed member provided on the fixed bracket;
a movable member provided on the apparatus body;
a restrictive member provided between a side face of said fixed member and a side face of said movable member such that said fixed member and said movable member are capable of relative movement only in a direction parallel to the pressure shaft;
a cutout provided on a surface of the pressure shaft facing said fixed member;
a driven lever pivotally supported on said fixed member so as to be rotatable, as the pressure shaft is moved, between a first state, in which one end of said driven lever abuts a front portion of said movable member and another end of said driven lever engages with said cutout of the pressure shaft, and a second state, in which the one end of said driven lever abuts with the front portion of said movable member and the other end of said driven lever engages with an outer surface of the pressure shaft other than the cutout;
a spring provided between a back portion of said fixed member and a back face of said movable member so as to press said movable member away from said fixed member;
wherein the pressure shaft is configured to support, at one end, the one of the electrodes and to move the one of the electrodes in a first direction to approach the other of the electrodes and so that the other end of said driven lever faces said cutout;
wherein said driven lever is configured such that in said second state, movement of said movable member is locked by said driven lever, and in said first state said movable member is movable over a predetermined distance to correct the error in position of the work piece and the electrodes; and
wherein the predetermined distance is set to be larger than a range of the error in position of the work piece and the electrodes.

2. The equalizing mechanism of claim 1, wherein said restrictive member comprises a groove portion on one of the side face of said fixed member and the side face of said movable member and a protrusion portion on the other of the side face of said fixed member and the side face of said movable member.

3. The equalizing mechanism of claim 2, wherein at least one of the one end and the other end of said driven lever comprises a roller.

4. The equalizing mechanism of claim 1, wherein at least one of the one end and the other end of said driven lever comprises a roller.

5. An equalizing mechanism of a welding apparatus comprising:
a fixed bracket configured to be connected to a robot arm or a mount;
a pair of electrodes for applying a weld to a workpiece;
a movable pressure shaft for moving one of the electrodes; and
an apparatus body, wherein the equalizing mechanism connects the fixed bracket and the apparatus body, is configured to correct an error in position of the work piece and the electrodes, and comprises:
a fixed member provided on said fixed bracket;
a movable member provided on said apparatus body;
a restrictive member provided between a side face of said fixed member and a side face of said movable member such that said fixed member and said movable member are capable of relative movement only in a direction parallel to the pressure shaft;
a cutout provided on a surface of the pressure shaft facing said fixed member;
a driven lever pivotally supported on said fixed member so as to be rotatable, as the pressure shaft is moved, between a first state, in which one end of said driven lever abuts a front portion of said movable member and another end of said driven lever engages with said cutout of the pressure shaft, and a second state, in which the one end of said driven lever abuts with the front portion of said movable member and the other end of said driven lever engages with an outer surface of the pressure shaft other than the cutout;

a spring provided between a back portion of said fixed member and a back face of said movable member so as to press said movable member away from said fixed member;

wherein the pressure shaft is configured to support, at one end, the one of the electrodes and to move the one of the electrodes in a first direction to approach the other of the electrodes and so that the other end of said driven lever faces said cutout;

wherein said driven lever is configured such that in said second state, movement of said movable member is locked by said driven lever, and in said first state said movable member is movable over a predetermined distance to correct the error in position of the work piece and the electrodes; and wherein the predetermined distance is set to be larger than a range of the error in position of the work piece and the electrodes.

6. The equalizing mechanism of claim 5, wherein said restrictive member comprises a groove portion on one of the side face of said fixed member and the side face of said movable member and a protrusion portion on the other of the side face of said fixed member and the side face of said movable member.

7. The equalizing mechanism of claim 6, wherein at least one of the one end and the other end of said driven lever comprises a roller.

8. The equalizing mechanism of claim 5, wherein at least one of the one end and the other end of said driven lever comprises a roller.

* * * * *